United States Patent
Tan

(10) Patent No.: US 9,874,679 B2
(45) Date of Patent: Jan. 23, 2018

(54) BACKLIGHT MODULE AND FABRICATING METHOD THEREOF, AND DISPLAY APPARATUS

(71) Applicant: BOE Technology Group Co., Ltd., Beijing (CN)

(72) Inventor: Jifeng Tan, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 177 days.

(21) Appl. No.: 14/907,713

(22) PCT Filed: Jul. 21, 2015

(86) PCT No.: PCT/CN2015/084550
§ 371 (c)(1),
(2) Date: Jan. 26, 2016

(87) PCT Pub. No.: WO2016/123918
PCT Pub. Date: Aug. 11, 2016

(65) Prior Publication Data
US 2016/0370536 A1    Dec. 22, 2016

(30) Foreign Application Priority Data

Feb. 2, 2015    (CN) .......................... 2015 1 0053936

(51) Int. Cl.
*F21V 8/00* (2006.01)
*H02N 1/04* (2006.01)
(52) U.S. Cl.
CPC ......... *G02B 6/0083* (2013.01); *G02B 6/0065* (2013.01); *H02N 1/04* (2013.01)

(58) Field of Classification Search
CPC ....... F21V 9/04; G02B 6/0033; G02B 6/0035; G02B 6/0036; G02B 6/0038;
(Continued)

(56) References Cited

FOREIGN PATENT DOCUMENTS

CN    101922669 A    12/2010
CN    202330948 U    7/2012
(Continued)

OTHER PUBLICATIONS

Nov. 9, 2015—(WO)—International Search Report and Written Opinion Appn PCT/CN2015/084550 with English Tran.
(Continued)

*Primary Examiner* — Anh Mai
*Assistant Examiner* — Steven Horikoshi
(74) *Attorney, Agent, or Firm* — Banner & Witcoff, Ltd.

(57) ABSTRACT

A backlight module and a fabricating method thereof, and a display apparatus are provided. The backlight module comprises a light emitting unit and a power generating unit for supplying power to the light emitting unit. The backlight module has a light-exiting surface; the power generating unit and the light-exiting surface face each other and are spaced from each other, light rays emitted from the light emitting unit enter between the power generating unit and the light-exiting surface and exit from the backlight module through the light-exiting surface; the power generating unit includes a first electrode, a power generating layer and a second electrode in a direction away from the light-exiting surface, and the first electrode is configured to reflect the light rays from the light emitting unit.

18 Claims, 3 Drawing Sheets

(58) Field of Classification Search
CPC .. G02B 6/0043; G02B 6/0061; G02B 6/0081; G02B 6/0083; H02N 1/04
See application file for complete search history.

(56) References Cited

FOREIGN PATENT DOCUMENTS

| | | |
|---|---|---|
| CN | 202948675 U | 5/2013 |
| CN | 203301397 U | 11/2013 |
| CN | 203376931 U | 1/2014 |
| CN | 103684035 A | 3/2014 |
| CN | 103778867 A | 5/2014 |
| CN | 103885255 A | 6/2014 |
| CN | 104300828 A | 1/2015 |
| CN | 104566121 A | 4/2015 |
| JP | 2004103411 A | 4/2004 |
| JP | 2008140695 A | 6/2008 |
| JP | 201114513 A | 1/2011 |
| WO | 2014000484 A1 | 1/2014 |

OTHER PUBLICATIONS

Jun. 2, 2016—(CN)—First Office Action Appn 201510053936.5 with English Tran.
Bo Meng, "A Transparent Single-Friction-Surface Triboelectric Generator and Self-Powered Touch Sensor" Energy Environ. Sci., Aug. 14, 2013, 6, pp. 3235-3240.
Oct. 25, 2016—(CN) Second Office Action Appn 201510053936.5 with English Tran.

BACKLIGHT MODULE AND FABRICATING METHOD THEREOF, AND DISPLAY APPARATUS

The application is a U.S. National Phase Entry of International Application No. PCT/CN2015/084550 filed on Jul. 21, 2015, designating the United States of America and claiming priority to Chinese Patent Application No. 201510053936.5, filed on Feb. 2, 2015. The present application claims priority to and the benefit of the above-identified applications and the above-identified applications are incorporated by reference herein in their entirety.

TECHNICAL FIELD

Embodiments of the present disclosure relate to a backlight module and a fabricating method thereof, and a display apparatus.

BACKGROUND

A display apparatus in related art is supplied with electric energy by an external power supply apparatus. For example, a television is supplied with an electric signal mainly by an external power supply. For another example, although a mobile phone itself includes a battery used for storing electric energy, the battery must be charged by an external power supply before being used; and when the battery is exhausted, it has to be charged by the external power supply for further use.

As can be seen, the related display apparatus has to rely on an external power supply apparatus to implement display, especially for mobile display apparatuses such as the mobile phone, which results in problems of inconvenience in use and the like.

SUMMARY

An embodiment of the present disclosure provides a backlight module, comprising a light emitting unit and a power generating unit for supplying power to the light emitting unit, wherein, the backlight module has a light-exiting surface; the power generating unit and the light-exiting surface face each other and are spaced from each other, light rays emitted from the light emitting unit enter between at least one power generating unit and the light-exiting surface and exit from the backlight module through the light-exiting surface; the power generating unit includes a first electrode, a power generating layer and a second electrode in a direction away from the light-exiting surface, and the first electrode is configured to reflect the light rays from the light emitting unit.

An embodiment of the present disclosure provides a fabricating method of a backlight module, the backlight module comprising a light emitting unit and a power generating unit for supplying power to the light emitting unit, wherein, the backlight module has a light-exiting surface; the power generating unit and the light-exiting surface face each other and are spaced from each other, light rays emitted from the light emitting unit enter between the power generating unit and the light-exiting surface and exit from the backlight module through the light-exiting surface; the power generating unit includes a first electrode, a power generating layer and a second electrode in a direction away from the light-exiting surface, and the first electrode is configured to reflect the light rays from the light emitting unit.

An embodiment of the present disclosure provides a display apparatus, comprising a display panel and the above backlight module.

BRIEF DESCRIPTION OF THE DRAWINGS

In order to more clearly illustrate the technical solution of the embodiments of the present disclosure, the accompanying drawings required to be used in descriptions of the embodiments or related art will be briefly described in the following; it is obvious that the accompanying drawings in the description in the following are only related to some embodiments of the present disclosure and are not limitative of the present disclosure.

DETAILED DESCRIPTION

The technical solutions in the embodiments of the present disclosure will be described below in a clearly and fully understandable way in connection with the accompanying drawings. It is obvious that the described embodiments are just a part but not all of the embodiments of the present disclosure. Based on the embodiments in the present disclosure, those ordinarily skilled in the art can obtain other embodiment(s), without any inventive work, which should be within the scope of the present disclosure.

Embodiments of the present disclosure provide a backlight module and a fabricating method thereof, and a display apparatus. The backlight module comprises a power generating unit, which is capable of collecting generated electric energy and applying it to display. A reflective layer of the backlight module and a first electrode of the power generating unit may be a same film layer, which is beneficial to integration and slimness of the backlight module.

A light crystal display itself does not emit light, and generally realizes display by a backlight module. In order to more clearly understand the backlight module provided by the embodiment of the present disclosure, types and basic structures of a related backlight module will be firstly introduced.

In a related art, backlight modules are divided into a backlight module of side-lit type and a backlight module of direct-lit type according to different arrangement positions of a light emitting unit in a LCD, wherein, a light emitting unit of the backlight module of side-lit type is disposed at a side surface of a LCD display screen, a light emitting unit of the backlight module of direct-lit type is disposed under the LCD display screen. For the backlight module of side-lit type and the backlight module of direct-lit type respectively shown in FIG. 1 and FIG. 2, light emitted from the light emitting unit of point light source or line light source enters the LCD display screen after transformed into a surface light source by a light guide plate.

Figure 1:
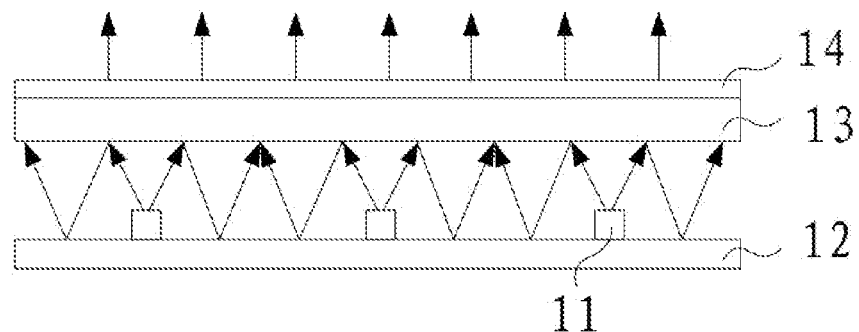
FIG. 1 is a schematic diagram of a related backlight module of direct-lit type.

As shown in FIG. 1, it is a schematic structural diagram of a related backlight module of direct-lit type, and the related backlight module of direct-lit type comprises a plurality of light emitting units 11, a reflective sheet 12, a light guide plate 13 and an optical film 14. Parts of light rays emitted from the light emitting units 11 directly enter the light guide plate 13, and parts of light rays are reflected into the light guide plate 13 by the reflective sheet 12. Here, the light guide plate 13 is not necessary, that is, the backlight module of direct-lit type as shown in FIG. 1 may not comprise the light guide plate 13.

Figure 2:
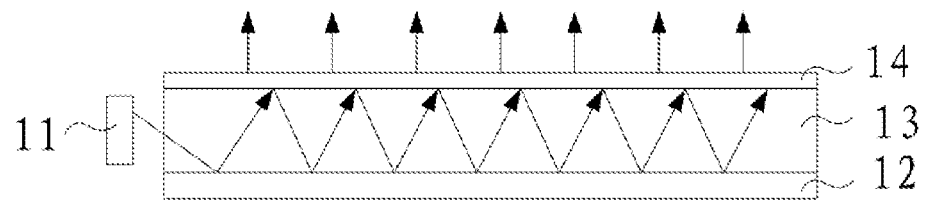
FIG. 2 is a schematic diagram of a related backlight module of side-lit type.

As shown in FIG. 2, it is a schematic structural diagram of a related backlight module of side-lit type, the related backlight module of side-lit type comprises a plurality of light emitting units 11, a reflective sheet 12, a light guide plate 13 and an optical film 14, wherein, the light emitting units 11 are positioned at a side surface of the light guide plate 13, light rays emitted from the light emitting units 11 enter the light guide plate 13 through the side surface and are reflected by the reflective sheet 12 into the light guide plate 13.

Wherein, the optical film generally comprises a diffusion sheet, a prism sheet and the like. Light emitted from the light emitting units is reflected to an upper surface of the light guide plate by the reflective sheet, transformed into plane light by the light guide plate, and emitted out after being diffused and mixed by the diffusion sheet and the prism sheet.

The backlight module in the embodiment of the present disclosure can be of the above backlight module of direct-lit type, or can be of the backlight module of side-lit type; meanwhile, in a case where the structures of the backlight module not related to an inventive point of the embodiment of the present disclosure are not improved, the embodiments and the accompanying drawings of the present disclosure only exemplify and illustrate partial structures related to an inventive point of the embodiment of the present disclosure.

Figure 3:
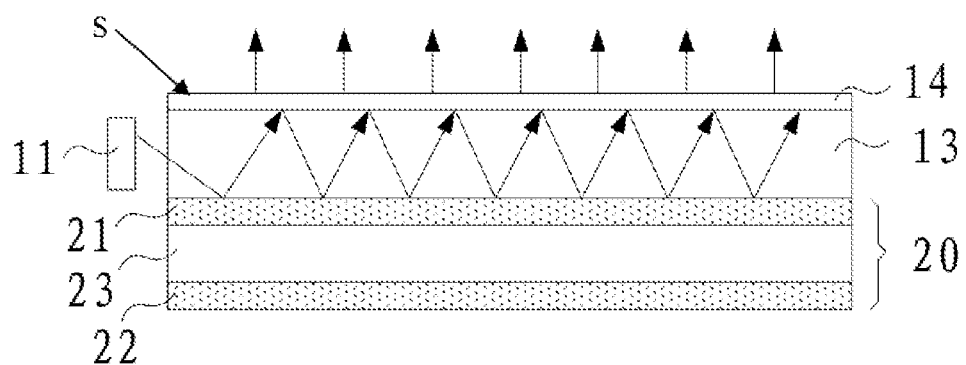
FIG. 3 is a schematic diagram of a backlight module provided by an embodiment of the present disclosure.

An embodiment of the present disclosure provides a backlight module, as shown in FIG. 3, comprising a light emitting unit 11, a light guide plate 13 and at least one power generating unit 20; with a case that the backlight module comprises one power generating unit 20 in FIG. 1 as an example, the power generating unit 20 includes a first electrode 21, a second electrode 22 and a power generating layer 23 positioned between the first electrode 21 and the second electrode 22, wherein, the first electrode 21 and the second electrode 22 are output ends of the power generating unit 20. The power generating unit 20 is configured to provide an electric signal to the light emitting unit 11. That is, the backlight module can drive the light emitting unit to emit light without an external power supply.

The backlight module has a light-exiting surface S, the power generating unit 20 is disposed on a side of the light guide plate 13 away from the light-exiting surface S, and the first electrode 21 of the at least one power generating unit is in direct contact with the light guide plate 13. Herein, the first electrode 21 is light reflective, and a side of the first electrode 21 facing the light guide plate is a reflective surface. The backlight module in FIG. 3 only comprises one power generating unit 20, that is, the first electrode 21 of the power generating unit 20 is in direct contact with the light guide plate 13. In another embodiment, the backlight module can comprise a plurality of power generating units, and any one of the plurality of power generating units can be the power generating unit 20 as shown in FIG. 3, with its first electrode 21 is in direct contact with the light guide plate 13. Alternatively, the first electrode of each of the plurality of power generating units may be in direct contact with the light guide plate 13.

In the embodiment of the present disclosure, the power generating unit 20 can be a friction power generating unit. The power generating layer may be a high polymer insulation layer. A principle of friction power generation is as follows: the first electrode has friction with the high polymer insulation layer, and the high polymer insulation layer forms an induced electric field respectively with the first electrode and the second electrode, thereby generating a voltage or current; then, the first electrode and the second electrode, as output ends of the power generating unit, collect negative charges and positive charges respectively, and the positive charges and the negative charges can be led out by a lead, so as to be supplied to the light emitting unit or a display panel.

An embodiment of the present disclosure provides a backlight module, comprising at least one power generating unit, and the power generating unit self can generate electricity so as to be applied to the backlight module or a display apparatus comprising the backlight module, wherein, a first electrode of one power generating unit is in direct contact with a light guide plate; the first electrode has light reflectivity; one side of the first electrode facing the light guide plate is a reflective surface; that is, the first electrode serves as a reflective layer of the light guide plate, thus, the first electrode of the power generating unit and the reflective layer of the light guide plate are a same layer of film material, without additionally forming a reflective sheet on the light guide plat. Therefore, the number of fabricating processes can be reduced, the film material is saved, production cost is lowered, and integration and the slimness of the backlight module are facilitated.

In an embodiment of the present disclosure, that the first electrode of the power generating unit is in direct contact with the light guide plate can be implemented as follows: the first electrode 21 of the power generating unit 20 is directly attached to the light guide plate 13 so as to form the backlight module as shown in FIG. 3. In another embodiment, that the first electrode is in direct contact with the light guide plate can be implemented as follows: the first electrode is deposited onto the light guide plate. That is, the light guide plate serves as a base substrate of the power generating unit, and the first electrode, the power generating layer and a second electrode are sequentially deposited on the light guide plate. In the case that the first electrode is deposited on the light guide plate, the first electrode is not easy to fall off from the light guide plate, and the integration of the power generating unit and the light guide plate is achieved.

For example, the light guide plate can be made of glass, polymethyl methacrylate (PMMA), polyimide (PI) and the like.

In the embodiment of the present disclosure, the first electrode has light reflectivity; the first electrode can be a metal electrode, or other electrode with a light reflective characteristic. The embodiment of the present disclosure will be described in detail with a case that the first electrode is a metal electrode made of Al, Ag, Cu and the like as an example.

In order to prevent the metal electrode from being eroded by vapor and oxygen in air, for example, the power generating unit further includes a protective layer, and a side of the first electrode and a side of the second electrode facing the power generating layer are covered by the protective layer.

For example, a material for forming the protective layer can be Mo or ITO (indium tin oxide). And, that the first electrode and the second electrode are covered by the protective layer can be implemented as follows: the protective layer is directly coated and deposited to cover the first electrode and the second electrode, without exposure.

Here, it is noted that, the reflective sheet in the related backlight module is generally a separate high polymer material film layer with a reflection function; however, in this application, the first electrode is employed as the reflective layer of the light guide plate, that is, the first electrode of the power generating unit and the reflective layer for the light guide plate are the same layer of film material. Therefore, additionally forming a reflective layer on the light guide plate is of no need, thus realizing the integration and the slimness of the power generating unit and the backlight module.

For example, among a surface on the side of the first electrode facing the light emitting layer, a surface on the side of the second electrode facing the light emitting layer, a surface on the side of the light emitting layer facing the first electrode and a surface on the side of the light emitting layer facing the second electrode, at least one of the surfaces has a concave-convex structure.

Figure 6:
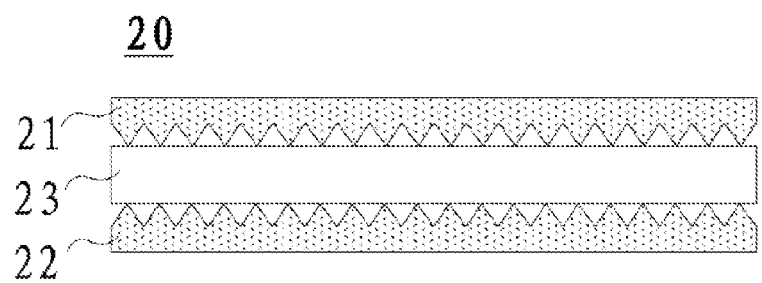
FIG. 6 is a schematic diagram of a power generating unit provided by an embodiment of the present disclosure.
Figure 7:
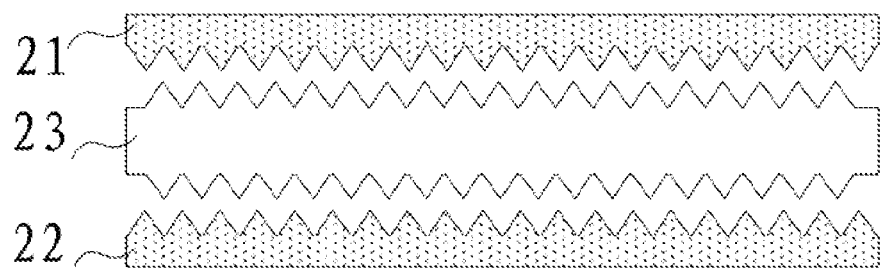
FIG. 7 is a schematic diagram of another power generating unit provided by an embodiment of the present disclosure.

As shown in FIG. 6, a case that the surface on the side of the first electrode 21 facing the power generating layer 23 and the surface on the side of the second electrode 22 facing the power generating layer 23 are of a concave-convex structure is used as an example. As shown in FIG. 7, the surface on the side of the first electrode 21 facing the power generating layer 23 and the surface on the side of the second electrode 22 facing the power generating layer 23 are of the concave-convex structure, and the surface on the side of the power generating layer facing the first electrode and the surface of the power generating layer facing the second electrode both are of the concave-convex structure. It is noted that, the concave-convex structures in FIG. 6 and FIG. 7 comprise triangular structures, and certainly, may also be any other irregular concave-convex structures and the like, which will not be particularly limited in the embodiment of the present disclosure.

Among the surface on the side of the first electrode 21 facing the power generating layer 23, the surface on the side of the second electrode 22 facing the power generating layer 23, the surface on the side of the power generating layer 23 facing the first electrode 21 and the surface on the side of the power generating layer 23 facing the second electrode 22, at least one of the surfaces is of the concave-convex structure, so that relative surface areas of the first electrode 21, the second electrode 22 and the power generating layer 23 are increased. Therefore, the first electrode, the second electrode and the power generating layer are in better contact to have friction, and more charges are induced at the first electrode and the second electrode.

Figure 8:
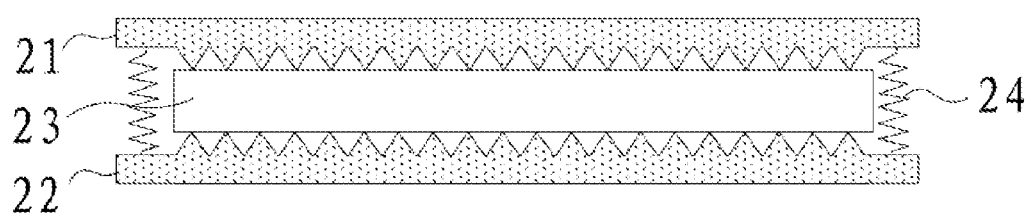
FIG. 8 is a schematic diagram of another power generating unit provided by an embodiment of the present disclosure.

For example, as shown in FIG. 8, elastic members are disposed between the first electrode 21 and the second electrode 22. The elastic members can serve as elastic supports for the first electrode 21 and the second electrode 22, such that an pressing-separating vibration state is generated among the first electrode, the second electrode and the power generating layer to form a voltage pulse; when an external force acts on the first electrode, the first electrode is pressed, a spring is compressed, and the power generating layer and the first electrode form a friction interface; when the external force disappears, the elastic deformation of the spring disappears, the first electrode is separated from the power generating layer, and the friction power generating unit rapidly restores to an original state. When a display is impacted by an external force, the elastic members can also play a buffering role so as to further enhance an anti-drop property of the display of the backlight module in the embodiment of the present disclosure.

Certainly, the pressing-separating vibration state can also be generated among the first electrode the second electrode and the power generating layer by means of another kind of external acting force to form a voltage pulse, which will not be limited in the embodiment of the present disclosure.

For example, as shown in FIG. 8, the elastic members 24 are positioned at edge positions of the first electrode 21 and the second electrode 22, without influencing the occurrence of contact friction between the first and second electrodes and the power generating layer.

Optionally, the elastic members are made of a resin material or a rubber material.

An existing spring fabricating process is complicated and coarse, and is difficult to be applied to a high-precision display panel; an elastic member fabricating process combined with a panel production line fabricating technology must be developed to realize a combination of the power generating unit and panel structures such as a watch, a mobile phone and a display. Therefore, in order to achieve technical grafting of a panel production line, the elastic members in the embodiment of the present disclosure can adopt an elastic resin material, for example, a PR adhesive; Herein, components of the PR adhesive and mass percentages thereof are: 90% of a solvent (ethers, esters and the like), 7% of a monomer (acrylics) and a polymer, 2% of a dispersing agent and 1% of an initiating agent. It is noted that, the mass percentages of the components of the above PR adhesive can be adjusted as required. The embodiment of the present disclosure takes the above PR adhesive as an example.

The material of the elastic members in the embodiment of the present disclosure adopts a high-elasticity PR adhesive. An elastic coefficient of the elastic members can be improved by adjusting the content of the monomer, such that a press-down amount of the elastic members can reach 10-15%, and a resilience ratio is greater than 95%.

In order to increase the elastic coefficient of the resin material, in the embodiment of the present disclosure, for example, particulate matters are doped into the resin material, wherein, a particle diameter of the particulate matters is no more than 100 μm. For example, acrylic particles or inorganic filler particles are doped into the high-elasticity PR adhesive so as to further improve a toughness of the PR adhesive, such that the elastic members suffer from shearing yield when a pressure is applied, absorb a large quantity of plastic deformation energies, and promotes a brittle-ductile transition of the elastic members. For example, the inorganic filler particles may be $CaCO_3$ with particle diameters of 1-11 μm, or superfine ceramics with particle diameters of 0.09 μm, or silicon balls with particle diameters of 3-10 μm and any combination thereof.

For example, in a case where the elastic members are made of the rubber material, the rubber material can be, for example, polystyrene, polybutadiene or polyisoprene.

For example, the backlight module comprises a plurality of power generating units, wherein, at least two power generating units 20 are disposed in an overlapping manner. In an embodiment of the present disclosure, the backlight module comprises three power generating units, namely, a first power generating unit, a second power generating unit and a third power generating unit, wherein, first electrodes of the first power generating unit and the second power generating unit are in direct contact with the light guide plate, and wherein, the third power generating unit is additionally disposed on the first power generating unit or the second power generating unit in an overlapping manner.

Figure 4:
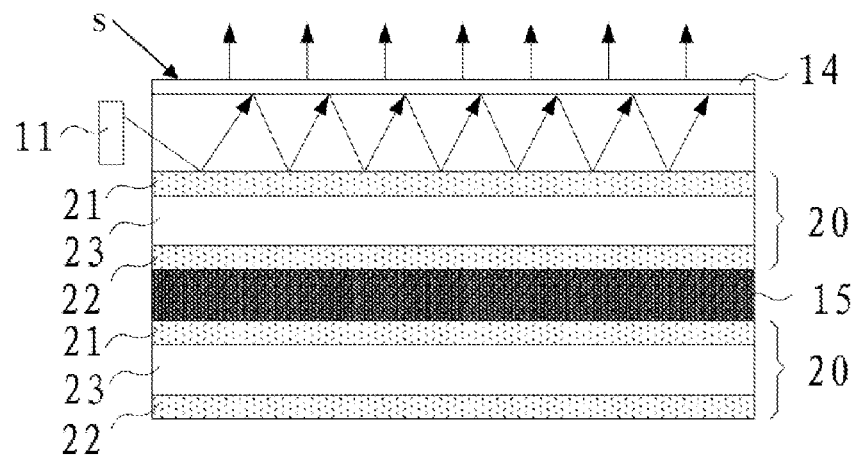
FIG. 4 is a schematic diagram of another backlight module provided by an embodiment of the present disclosure.

In the embodiment of the present disclosure in FIG. 4, with a case that the backlight module comprises two power generating units as an example, the two power generating units are disposed in an overlapping manner, wherein, the first electrode 21 of one of the power generating units 20 is in direct contact with the light guide plate 13. For example, a balance weight layer 15 is formed between two adjacent power generating units 20 which are disposed in an overlapping manner.

It is noted that, according to different uses of the power generating units, the balance weight layer may be an insulation layer. Output ends of the first electrodes and the second electrodes of the two power generating units can be electrically connected by external members, so as to realize series connection or parallel connection of the two power generating units.

The balance weight layer is an insulation layer, which may reduce an electrostatic adsorption force generated between the electrodes on two sides after charges are collected, avoid weakening of a power generating effect, and enhance a friction effect between the electrodes and the power generating layers on both sides of the balance weight layer.

In a case that no balance weight layer is presented, the second electrode of one power generating unit is in direct contact and electric connection with the first electrode of the other power generating unit. The thicknesses of the first electrode and the second electrode are adjusted so that the common electrode plays a role of the balance weight layer, and the series connection of the two power generating units is realized.

Figure 5:
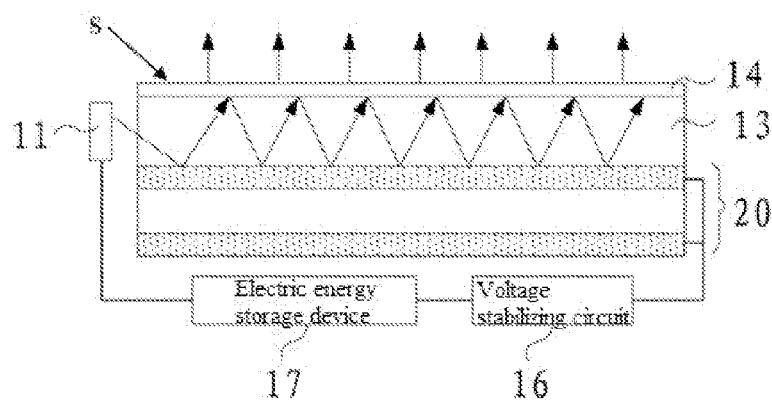
FIG. 5 is a schematic diagram of another backlight module provided by an embodiment of the present disclosure.

As shown in FIG. 5, the backlight module provided by the embodiment of the present disclosure can further comprise a voltage stabilizing circuit 16 electrically connected with the power generating unit 20, and the power generating unit 20 inputs an electric signal to the voltage stabilizing circuit 16. The electric signal output by the power generating unit 20 is generally a pulse signal, and a stable electric signal can be output by the voltage stabilizing circuit 16.

Furthermore, as shown in FIG. 5, the backlight module provided by the embodiment of the present disclosure further comprises an electric energy storage device 17 electrically connected with the power generating unit 20. The electric energy storage device 17 is configured to store electric energy output by the power generating unit 20 so as to provide an electric signal to the backlight module or a display panel as required. Wherein, as shown in FIG. 6, the electric signal output by the power generating unit 20 can be input to the electric energy storage device 17 after passing through the voltage stabilizing circuit 16, for electric energy storage.

An embodiment of the present disclosure provides a fabricating method of a backlight module, comprising:

Step 101: providing a light guide plate.

Various optical films can be formed onto the light guide plate. In the embodiment of the present disclosure, only the light guide plate related to the power generating unit is described. Other structures of the backlight module can be fabricated with reference to the related art, and are not particularly described in the embodiment of the present disclosure.

Step 102: providing at least one power generating unit, wherein, the providing a power generating unit includes: forming a first electrode, a second electrode and a power generating layer positioned between the first electrode and the second electrode; wherein, the first electrode of the power generating unit is in direct contact with the light guide plate, and the first electrode has light reflectivity and serves as a reflective layer for the light guide plate.

For example, the above step 102 includes: depositing a conductive film on the light guide plate to form the first electrode. For example, the light guide plate can be made of glass, PMMA, PI and the like. A metal layer made of Al, Ag, Cu and the like with a relatively high reflectivity can be evaporated onto the light guide plate, and generally has a thickness of 1000-4000 angstroms.

The backlight module formed by the above manner is small in thickness and consumes less film materials, and can make the light guide plate combined with the power generating unit. The first electrode is deposited onto the light guide plate, thus the first electrode is difficult to fall off from the light guide plate, and integration of the power generating unit and the light guide plate is realized.

Alternatively, that the first electrode 21 of the power generating unit 20 is in direct contact with the light guide plate 13 can be implemented as follows: forming the power generating unit 20 and directly attaching the first electrode 21 of the power generating unit 20 to the light guide plate 13. Such a forming manner is simple in process and is easily realized.

For example, protective layer is formed on the side of the first electrode close to the power generating layer and the side of the second electrode close to the power generating layer. For example, a material for forming the protective layer can be Mo or ITO. And, that the first electrode and the second electrode are covered by the protective layer can be implemented as follows: the protective layer is directly coated and deposited to cover the first electrode and the second electrode, without exposure. The protective layer can prevent the metal electrode from being eroded by vapor and oxygen in air.

For example, the backlight module comprises at least two power generating units, and forming at least two power generating units, for example, includes:

Step 201: forming a power generating unit.

Step 202: forming a balance weight layer on the power generating unit.

It is noted that, according to different uses of the power generating units, the balance weight layer can be an insulation layer. Output ends of the first electrodes and the second electrodes of the two power generating units can be electrically connected by external members, so as to realize series connection or parallel connection of the two power generating units.

The balance weight layer is an insulation layer, which may reduce an electrostatic adsorption force generated between the electrodes on two sides after charges are collected, avoid weakening of a power generating effect, and enhance a friction effect between the electrodes and the power generating layers on both sides of the balance weight layer.

When no balance weight layer is presented, the second electrode of one of the power generating units is in direct contact and electric connection with the first electrode of the other power generating unit. The thicknesses of the first electrode and the second electrode are adjusted such that the common electrode plays a role of the balance weight layer, and the series connection of the two power generating units is realized.

Step 203: forming another power generating unit on the balance weight layer.

The above step 202 and the above step 203 can be performed repeatedly, so that more than two power generating units are formed.

A case that the backlight module comprises three power generating units is taken as an example in the following. Forming three power generating units includes:

Step 021: forming a first power generating unit.

Step 022: forming a balance weight layer on the first power generating unit.

Step 023: forming a second power generating unit on the balance weight layer.

Step 024: forming a balance weight layer on the second power generating unit.

Step 025: forming a third power generating unit on the balance weight layer.

For example, the forming the power generating unit can refer to the description of the above step 102, which will not be repeated herein.

An embodiment of the present disclosure provides a display apparatus, comprising the backlight module provided by any embodiment of the present disclosure and a display panel.

One example of the display apparatus is a liquid crystal display apparatus. Correspondingly, the display panel is a liquid crystal display panel. In the liquid crystal display panel, a TFT array substrate and an opposed substrate are disposed opposite to each other to form a liquid crystal cell, and a liquid crystal material is filled into the liquid crystal cell. The opposed substrate is, for example, a color filter substrate. A pixel electrode of each pixel unit of the TFT array substrate is configured to apply an electric field to control a rotation degree of a liquid crystal material so as to perform a display operation.

For example, the power generating unit in the backlight module provided by the embodiment of the present disclosure can provide an electric signal to the display panel.

According to the above description, the embodiments of the present disclosure can at least provide structures and methods as follows:

(1) A backlight module, comprising a light emitting unit and a power generating unit for supplying power to the light emitting unit, wherein, the backlight module has a light-exiting surface, the power generating unit and the light-exiting surface face each other and are spaced from each other, light rays emitted from the light emitting unit enter between the power generating unit and the light-exiting surface and exit from the backlight module through the light-exiting surface; the power generating unit includes a first electrode, a power generating layer and a second electrode in a direction away from the light-exiting surface, and the first electrode is configured to reflect the light rays from the light emitting unit.

(2) The backlight module according to (1) further comprising a light guide plate positioned between the power generating unit and the light-exiting surface, and the first electrode of the power generating unit is in direct contact with the light guide plate.

(3) The backlight module according to (2), wherein the first electrode is directly deposited on the light guide plate.

(4) The backlight module according to any one of (1) to (3), wherein, the power generating unit is a friction power generating unit, and the power generating layer is a high polymer insulation layer.

(5) The backlight module according to (4), wherein, the power generating layer is a high polymer insulation layer.

(6) The backlight module according to any one of (1) to (5), wherein, among a surface on a side of the first electrode facing the light emitting layer, a surface on a side of the second electrode facing the light emitting layer, a surface on a side of the light emitting layer facing the first electrode and a surface on a side of the light emitting layer facing the second electrode, at least one of the surfaces has a concave-convex structure.

(7) The backlight module according to any one of (1) to (6), wherein, an elastic members is disposed between the first electrode and the second electrode.

(8) The backlight module according to any one of (1) to (7), wherein, the backlight module comprises a plurality of power generating units, wherein at least two of the power generating units are disposed in an overlapping manner.

(9) The backlight module according to (8), wherein, a balance weight layer is formed between two adjacent power generating units which are disposed in an overlapping manner.

(10) The backlight module according to any one of (1) to (9), wherein, the first electrode is a metal electrode.

(11) The backlight module according to any one of (1) to (10), wherein, the power generating unit further includes a protective layer, and a side of the first electrode facing the power generating layer and a side of the second electrode facing the power generating layer are covered by the protective layer.

(12) The backlight module according to (7), wherein, the elastic member is of a resin material or a rubber material.

(13) The backlight module according to any one of (1) to (12), further comprising a voltage stabilizing circuit electrically connected with the power generating unit, the voltage stabilizing circuit being configured to perform voltage stabilization treatment on an electric signal from the power generating unit.

(14) The backlight module according to any one of (1) to (13), further comprising: an electric energy storage device electrically connected with the power generating unit, the electric energy storage device being configured to store electric energy output by the power generating unit.

(15) A fabricating method of a backlight module, the backlight module having a light-exiting surface, the method comprising steps of:

Providing a light emitting unit; and

Providing a power generating unit for supplying power to the light emitting unit, wherein, the power generating unit and the light-exiting surface face each other and are spaced from each other, light rays emitted from the light emitting unit enter between at least one power generating unit and the light-exiting surface and exit from the backlight module through the light-exiting surface; the power generating unit includes a first electrode, a power generating layer and a second electrode in a direction away from the light-exiting surface, and the first electrode is configured to reflect the light rays from the light emitting unit.

(16) The fabricating method according to (15), further comprising: providing a light guide plate positioned between the power generating unit and the light-exiting surface, wherein, the providing a power generating unit includes: depositing a conductive film on the light guide plate to serve as the first electrode.

(17) The fabricating method according to (15) or (16), wherein, the providing a power generating unit includes:

Providing one power generating unit;

Arranging a balance weight layer on the power generating unit;

Arranging another one power generating unit on the balance weight layer.

(18) A display apparatus, comprising a display panel and the backlight module according to any one of (1) to (14).

Although the embodiments of the present disclosure have been described in detail by using general description and detailed implementation modes, some modifications or alterations may be made thereto on the basis of the embodiments of the present disclosure, which will be apparent to those skilled in the art. Accordingly, all such modifications or alterations without departing from the spirit of the embodiment of the present disclosure fall into the claimed scope of the embodiments of the present disclosure.

This application claims priority of Chinese Patent Application No. 201510053936.5, filed on Feb. 2, 2015, the disclosure of which is incorporated herein by reference in its entirety as part of the present application.

What is claimed is:

1. A backlight module, comprising a light emitting unit and a power generating unit for supplying power to the light emitting unit, wherein, the backlight module has a light-exiting surface, the power generating unit and the light-exiting surface face each other and are spaced from each other, light rays emitted from the light emitting unit enter between the power generating unit and the light-exiting surface and exit from the backlight module through the light-exiting surface; the power generating unit includes a first electrode, a power generating layer and a second electrode in a direction away from the light-exiting surface, and the first electrode is configured to reflect the light rays from the light emitting unit.

2. The backlight module according to claim 1, further comprising a light guide plate positioned between the power generating unit and the light-exiting surface, and the first electrode of the power generating unit is in direct contact with the light guide plate.

3. The backlight module according to claim 2, wherein, the first electrode is directly deposited on the light guide plate.

4. The backlight module according to claim 1, wherein, the power generating unit is a friction power generating unit.

5. The backlight module according to claim 4, wherein, the power generating layer is a high polymer insulation layer.

6. The backlight module according to claim 1, wherein, among a surface on a side of the first electrode facing the power generating layer, a surface on a side of the second electrode facing the power generating layer, a surface on a side of the power generating layer facing the first electrode and a surface on a side of the power generating layer facing the second electrode, at least one of the surfaces has a concave-convex structure.

7. The backlight module according to claim 1, wherein, an elastic member is disposed between the first electrode and the second electrode.

8. The backlight module according to claim 1, wherein, the backlight module comprises a plurality of power generating units, wherein at least two of the power generating units are disposed in an overlapping manner.

9. The backlight module according to claim 8, wherein, a balance weight layer is formed between two adjacent power generating units which are disposed in an overlapping manner.

10. The backlight module according to claim 1, wherein, the first electrode is a metal electrode.

11. The backlight module according to claim 1, wherein, the power generating unit further includes a protective layer, and a side of the first electrode facing the power generating layer and a side of the second electrode facing the power generating layer are covered by the protective layer.

12. The backlight module according to claim 7, wherein, the elastic member is of a resin material or a rubber material.

13. The backlight module according to claim 1, further comprising: a voltage stabilizing circuit electrically connected with the power generating unit, the voltage stabilizing circuit being configured to perform voltage stabilization treatment on an electric signal from the power generating unit.

14. The backlight module according to claim 1, further comprising: an electric energy storage device electrically connected with the power generating unit, the electric energy storage device being configured to store electric energy output by the power generating unit.

15. A display apparatus, comprising a display panel and the backlight module according to claim 1.

16. A fabricating method of a backlight module, the backlight module having a light-exiting surface, the method comprising steps of:

providing a light emitting unit; and providing a power generating unit for supplying power to the light emitting unit, wherein, the power generating unit and the light-exiting surface face each other and are spaced from each other, light rays emitted from the light emitting unit enter between the power generating unit and the light-exiting surface and exit from the backlight module through the light-exiting surface; the power generating unit includes a first electrode, a power generating layer and a second electrode in a direction away from the light-exiting surface, and the first electrode is configured to reflect the light rays from the light emitting unit.

17. The fabricating method according to claim 16, further comprising: providing a light guide plate positioned between the power generating unit and the light-exiting surface, wherein, the providing a power generating unit includes: depositing a conductive film on the light guide plate to serve as the first electrode.

18. The fabricating method according to claim 16, wherein, the providing a power generating unit includes:

providing one power generating unit;

arranging a balance weight layer on the power generating unit;

arranging another one power generating unit on the balance weight layer.

* * * * *